UNITED STATES PATENT OFFICE

FERDINAND KELLER AND KARL SCHNITZSPAHN, OF OFFENBACH-ON-THE-MAIN, GERMANY, ASSIGNORS TO GENERAL ANILINE WORKS, INC., OF NEW YORK, N. Y., A CORPORATION OF DELAWARE

ACID DIAZONIUM SALTS OF ARYL SULPHONIC ACIDS

No Drawing. Application filed December 24, 1925, Serial No. 77,576, and in Germany January 19, 1925.

The present invention relates to diazosalt preparations for dyeing and printing. More particularly it relates to preparations comprising a compound of the general formula:

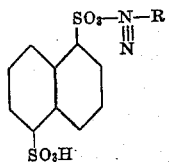

wherein R represents an unsulphonated substituted aromatic radical. The compounds of the above given formula which have not been described heretofore in the literature, are obtainable either by causing a strongly acid diazo salt solution to react with a 1.5-naphthalene-disulphonic acid metal salt or by treating a weakly acid diazo salt solution, obtained in the customary manner, with a free 1.5-naphthalene-disulphonic acid. The tendency to form acid salts varies greatly with the different diazonium bases. In the case of many diazocompounds, they are formed very easily as for example, with diazo-3-nitro-4-amino-1-toluene, which yields a product having the following formula:

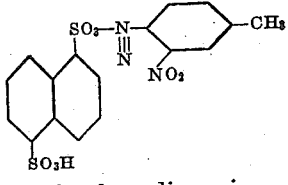

In the case of other diazonium bases they are produced with more difficulty. Many of the acid salts are so stable in water that they can be recrystallized unchanged from warm water at 70° C.; others on the other hand are dissociated when dissolved in a large amount of water into neutral salts and free naphthalene disulphonic acids. The acid salts are more or less strongly colored, fine, crystalline powders, whose aqueous solutions react acid to Congo so that their free sulpho-groups can be sharply titrated against Congo with normal caustic soda. The acid salts of the neutral 1.5-disulphonates are more frequently of different colors; thus, the acid 1.5-naphthalene disulphonate obtained from diazotized 3-nitro-4-amino-1-toluene is of a greenish color, in contradistinction to the neutral disulphonate which is of a yellow color.

The acid 1.5-naphthalene disulphonic acid diazosalts present some advantages when used as diazodyesalts over the corresponding neutral compounds the use of which diazodyesalts preparations has been described and claimed in our copending application Serial No. 178,132, filed March 24, 1927, the subject matter of which has been divided out from this application. We wish to mention, however, that the acid diazosalts as well as the neutral diazosalts represent a commercial advance over the hitherto known preparations due to a number of excellent characteristics of the acid as well as neutral salts, such as, for instance, their capability of being readily separated in a uniform state, their ability of being easily dried, their property of being sufficiently soluble and the clearness of the shades they produce as well as their high stability. The acid salts separate out as a rule in a better crystallized condition and are therefore more easily filtered and more easily dried, and at the same time give larger yields than do the neutral salts. In spite of the greater ease of separation the solubility of the acid disulphonates is as a rule noticeably greater than is that of the neutral salts. Furthermore, as a rule the stability of the diazosalt preparations obtained from the acid 1.5-naphthalene disulphonic acid diazosalts is superior to that of those which are obtained from the neutral salts.

Especially important are the diazosalt preparations obtained from negatively substituted unsulphonated amines especially the negatively substituted aminophenol ethers and of the latter group the nitrated aminophenol ethers.

If it is desired to obtain neutral water solutions which are useful directly for dyeing, from the acid 1.5-naphthalene disulphonates, the dry acid 1.5-naphthalene disulphonates can be mixed advantageously with an amount of suitable alkali corresponding to their acidity. Suitable alkalies are for example, magnesia, zinc oxide, calcium hydroxide and alkali metal carbonates or bicarbonates.

The following examples are given to illustrate the invention:

(1) Acid 1.5-naphthalene disulphonate of diazotized 5-nitro-2-amino-1 anisol of 34-35% diazotized nitroanisidin base content having the formula:

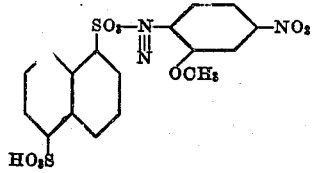

will serve as a stable dye salt without addition of other substances, or its content may be regulated to the desired proportion by the addition of suitable diluting materials in order to yield to the dyer a product whose dye content is always the same. The aqueous solution of the product is then neutralized with sodium acetate or chalk for example before use for dyeing, Congo being the indicator.

(2) The product obtained by mixing 250 parts of dry acid 1.5-naphthalene disulphonate of diazotized 3-nitro-4-amino-1-toluol of 31% nitrotoluidine content having the formula:

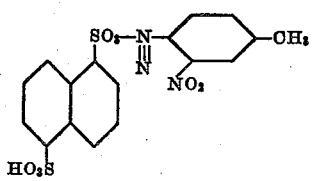

with 40 parts of anhydrous sodium carbonate and 100 parts of partially dehydrated aluminum sulfate, possesses a very high stability and good solubility. The sodium carbonate on dissolving enters into a double decomposition reaction with the acid disulphonate. The aqueous solution of the product reacts neutral and is directly useful for dyeing.

(3) The product obtained by intimately mixing 70 parts of acid 1.5-naphthalene disulphonate of diazotized 4-chlor-2-amino-1-phenylether of 32% chloraminophenylether content having the formula:

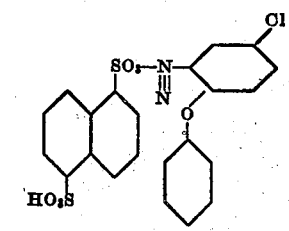

6 parts of prepared chalk and 34 parts of commercial sodium salt of 1.6-naphthalene disulphonic acid yields in water a dyesalt solution which can be used directly.

We claim:

1. Diazosalt preparations for dyeing and printing comprising acid 1.5-naphthalene disulphonic acid diazonium salts of unsulphonated, substituted aromatic amines.

2. A diazo salt preparation for dyeing and printing comprising an acid 1.5-naphthalene disulphonic acid diazonium salt of an unsulphonated substituted aromatic amine, mixed with an amount of an alkali corresponding to its acidity.

3. As new products, the acid 1.5-naphthalene disulphonic acid diazonium salts of unsulphonated, substituted aromatic amines of the general formula:

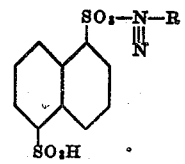

wherein R represents a substituted unsulphonated aromatic radical, which react strongly acid, are soluble in water, and are faintly to more strongly colored crystalline powders.

4. As new products, the acid 1.5-naphthalene disulphonic acid diazonium salts of unsulphonated, negatively substituted amines of the general formula:

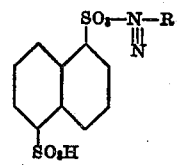

wherein R represents an unsulphonated aromatic radical substituted by halogen or nitro, and react strongly acid, are soluble in water, which are faintly to more strongly colored crystalline powders.

5. As new products, the acid 1.5-naphthalene disulphonic acid diazonium salts of the general formula:

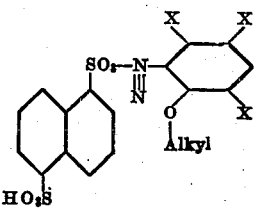

wherein the X's represent hydrogen atoms of which any one may be halogen or nitro, which react strongly acid, are soluble in water, and which are faintly to more strongly colored crystalline powders.

6. The process which comprises treating a weakly mineral acid diazo salt solution of an insulphonated amino compound of the following general formula:

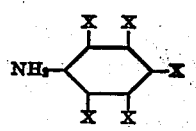

wherein the X's represent hydrogen atoms one or more of which may be replaced by halogen or nitro, with free 1.5-naphthalene disulphonic acid.

7. The process which comprises treating a weakly mineral acid diazo salt solution of an unsulphonated amino compound of the following formula:

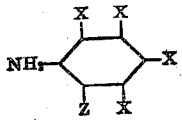

wherein the X's represent hydrogen atoms one or more of which may be replaced by halogen or nitro and Z represents a substituent of the group consisting of alkyl or alkoxy, with free 1.5-naphthalene disulphonic acid.

8. The process which comprises treating a weakly mineral acid diazo salt solution of an amino compound of the following formula:

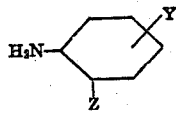

wherein Y represents halogen or nitro and Z alkyl or alkoxy, with free 1.5-naphthalene disulphonic acid.

9. As new products, the acid 1.5-naphthalene disulphonic acid diazonium salts of the general formula:

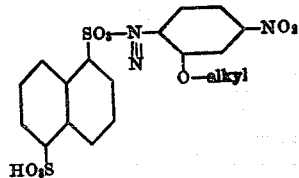

which react strongly acid, are soluble in water, and which are faintly to more strongly colored crystalline powders.

In testimony whereof, we affix our signatures.

FERDINAND KELLER.
KARL SCHNITZSPAHN.